(12) United States Patent
Heintges et al.

(10) Patent No.: US 9,511,456 B2
(45) Date of Patent: Dec. 6, 2016

(54) METHOD FOR PRODUCING A THROTTLE

(75) Inventors: Oliver Heintges, Helleuthal-Losheim (DE); Joao Duarte, Curltlba (BR); Rene Gueldenberg, Bexbach (DE)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 14/124,768

(22) PCT Filed: May 23, 2012

(86) PCT No.: PCT/EP2012/059591
§ 371 (c)(1),
(2), (4) Date: Dec. 9, 2013

(87) PCT Pub. No.: WO2012/168076
PCT Pub. Date: Dec. 13, 2012

(65) Prior Publication Data
US 2014/0096390 A1   Apr. 10, 2014

(30) Foreign Application Priority Data

Jun. 8, 2011   (DE) .................. 10 2011 077 182

(51) Int. Cl.
*B23P 15/00* (2006.01)
*B21K 21/08* (2006.01)

(52) U.S. Cl.
CPC .............. *B23P 15/001* (2013.01); *B21K 21/08* (2013.01); *B23P 15/00* (2013.01); *Y10T 29/49405* (2015.01); *Y10T 29/5191* (2015.01)

(58) Field of Classification Search
CPC ...... B23P 15/00; B23P 15/001; B21K 21/08; Y10T 29/49405; Y10T 29/5191
See application file for complete search history.

(56) References Cited

U.S. PATENT DOCUMENTS 4,297,774 A * 11/1981 Medlock .................. B23P 6/00
29/402.19
2005/0003740 A1* 1/2005 Fath ...................... B24B 31/116
451/38

FOREIGN PATENT DOCUMENTS

| DE | 2501465  | 7/1976 |
|----|----------|--------|
| DE | 19602360 | 7/1997 |
| EP | 0000438  | 1/1979 |

(Continued)

OTHER PUBLICATIONS

International Search Report for Application No. PCT/EP2012/059591 dated Aug. 2, 2012 (3 pages).

*Primary Examiner* — Moshe Wilensky
(74) *Attorney, Agent, or Firm* — Michael Best & Friedrich LLP (57) ABSTRACT

The invention relates to a method for producing a throttle (34) in a flow channel (24) that extends in a component (8), in particular a valve part, and that is used to control a medium from a control chamber. According to the invention, after formation of the flow channel (24) in the valve part (8), the throttle (34) is stamped by plastically deforming material in the vicinity of the flow channel (24) in the direction of the planned throttle (34), and the plastically deformed material acts in such a manner on a molding tool (50, 57, 58) introduced into the flow channel (24) in the position of the planned throttle (34) that a contour (57, 58) of the molding tool (50) defining the throttle (34) is formed in the flow channel (24). The plastic deformation is effected by a stamping die (40) moved with a defined force, while the contour of the throttle (34) is formed by a tip portion (57, 58) of a counter-die (50) used as the molding tool.

9 Claims, 8 Drawing Sheets

(56) References Cited

FOREIGN PATENT DOCUMENTS

| | | |
|---|---|---|
| JP | S61195839 | 12/1986 |
| JP | 2224844 | 9/1990 |
| JP | 2000140987 | 5/2000 |
| JP | 2007253175 | 10/2007 |

* cited by examiner

METHOD FOR PRODUCING A THROTTLE

BACKGROUND OF THE INVENTION

The invention is based on a method for producing a throttle in a flow channel of a component, in particular a valve part. The invention is further based on an apparatus for implementing the method.

In valves which are used in automotive engineering, and there, in particular, in fuel injection technology, a flow channel, which runs within a valve part of a fuel injector, serves to control a pressurized medium flowing through the flow channel extending between a control chamber of a guide bore, in which an injection valve member is accommodated, and a valve seat of the valve part. In order to obtain a stable flow through the valve, and hence a precisely defined, controllable injection behavior, even in the event of low pressure in the control chamber, the flow cross section in the flow channel is purposefully constricted by means of a throttle configured in the inflow-side inlet region of the flow channel, which throttle is also referred to as an outlet throttle.

A method for stamping, decorating and shaping a semi-finished product is known from DE 25 01 465. The semi-finished product is here shaped by means of a forming tool, while the stamping is performed by means of an appropriately configured counter-die. Alternatively, if a negative forming tool is used, the stamping is performed by means of a stamping die. A drawback herewith is that this method is suitable only for the stamping of foils on a carrier material and thus has only a limited range of application.

In traditional, known valves, in particular of the kind for use in fuel injection systems, the outlet throttle extending between the control chamber and a funnel of the valve, said funnel being configured as a closing element, is produced, for instance, by a stamping process and a following erosion process, whereby the throttle geometry is produced. If the respective process axes of both processes do not here run coaxially to each other, but rather the two process-determining axes, due to a misorientation for instance, are mutually offset, in that the erosion operation, for example, has an eccentricity in relation to the stamping operation, then a discrepancy arises between the stamping geometry and the erosion geometry in the throttle which is hereupon produced, whereby the effective length of the throttle is influenced or shortened and thus the flow characteristics of the throttle in the valve part are influenced. This can lead to increased risk of cavitation in the throttle which is produced in this way. The flow through a throttle which does not reliably produce cavitation would react to different differential pressures before and after the throttle with changes in volumetric flow rate, which makes quantity control more difficult. In addition, it can happen that, in the stamping operation, a herein occurring axially offset residual cross section of the throttle contour, i.e. the narrowest cross section which remains open after the stamping operation, cannot be fully removed by the erosion operation. Together with the erosion contour, an over-large cross section for the medium which flows through during normal operation of the valve part can thereby be obtained.

SUMMARY OF THE INVENTION

The method has the advantage that the stamping operation, i.e. the plastic deformation of the material in the valve part, is effected by a stamping die in the vicinity of the planned throttle, simultaneously with the contouring of the throttle by means of a counter-die, in a single work step, wherein the material which has been plastically deformed by the stamping die comes to bear against the contour of the counter-die inserted in the flow channel and the throttle contour is thereby produced in the flow channel, thus ensuring that the entire throttle geometry is defined by means of the counter-die in a single work step. Asymmetries in the throttle contour, as can arise in production methods involving various work steps for the contour formation of the throttle and which can lead to a change in throttling length, are largely avoided by the inventive production method, since here the throttling length is substantially defined by the position of the contour-forming region of the counter-die in the flow channel of the valve part. Since, in the inventive method, the entire throttle geometry is also produced in a single work step, the production step, comprising erosion of the throttle contour, which is otherwise necessary in the traditional production method is in this case eliminated, so that the inventive production process can be performed with comparatively lower production costs.

BRIEF DESCRIPTION OF THE DRAWINGS

With reference to the appended drawings, one embodiment of the invention shall be described below. In schematic views.

DETAILED DESCRIPTION

Figure 1:
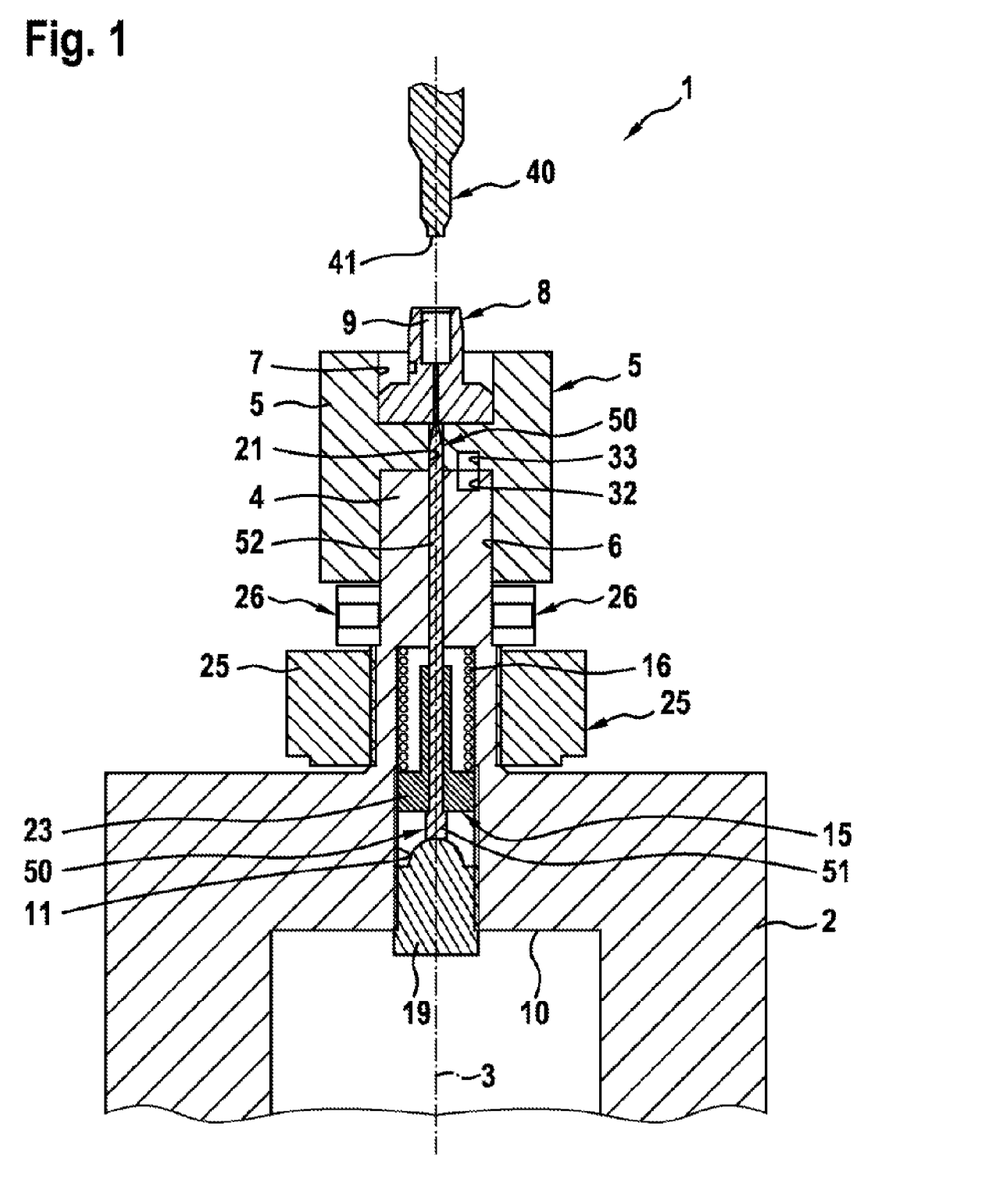
FIG. 1 shows a sectional view of a stamping device designed to implement the inventive method, comprising a valve part accommodated therein.

FIG. 1 shows a stamping device designed for the implementation of the inventive method and denoted in its entirety by 1, which stamping device has a main body 2 having a connecting branch 4 which protrudes upward, in the shape of a neck, coaxially with the longitudinal center axis 3 of the stamping device 1 and on which a receiving sleeve 5 of H-shaped section is mounted with its lower receiving bore 6 and forms a head part of the apparatus, while its upper receiving bore 7, arranged coaxially thereto, serves to receive a component 8 to be machined.

The component is constituted by a valve part 8 of a fuel injector; in a valve part 8 of this type is formed, in a metal-cutting machining step, a flow channel or outlet channel 24, which runs in the direction of flow between, on the inlet side, a control chamber disposed at the bottom in a guide bore of the valve part and, on the outlet side, a valve seat, wherein the valve seat is configured in the shape of a funnel in order to receive a closing element for the opening and closing of the flow channel. The valve part 8 is accommodated in the receiving bore 7 of the receiving sleeve 5 such that the guide bore 9 of the valve part 8 is oriented upward along the longitudinal center axis or axis of symmetry 3 of the stamping device 1, so that, for the stamping, a stamping die 40 oriented along the longitudinal center axis or axis of symmetry 3 can be introduced into the guide bore 9. Starting from the bottom side 10 of the stamping device 1, a receiving bore 11, realized as a stepped bore, passes through the main body 2 and the sleeve-shaped connecting branch 4 along the longitudinal center axis 3, wherein the inner diameter of the stepped bore 11 is substantially smaller in its upper portion than in the lower portion.

The receiving bore 11 serves to receive a counter-die 50, which is mounted in the lower, diametrically larger portion of the receiving bore 11 such that its downward pointing end 51, which is thickened on the head side, is supported against a ball pressure screw 19 seated on the lower end of the receiving bore 11 and its shank 52 extending upward from the head-side end 51 passes through a sleeve-shaped spring seat 15 accommodated in an axially displaceable manner within the diametrically larger region of the receiving bore 11. The spring seat 15 here has a longitudinally axial through bore 17 having an inner diameter tailored to the outer diameter of the shank 52 of the counter-die 50 in order to permit an axial play of the shank in the through bore. In the installation position, a compression spring 16 encompasses a sleeve-shaped extension 18 of the spring seat 15, wherein the upper end of the compression spring 16 bears against the step 12 to the diametrically smaller portion of the receiving bore 11 and the downward pointing end of the compression spring 16 rests on a circumferential collar 23 of the spring seat 15, which collar protrudes radially on the lower end of the extension 18; the collar 23 of the spring seat 15 thus abuts against the head 51 of the counter-die 50 and presses this against the ball pressure screw 19. The counter-die 50 mounted in the diametrically larger portion of the receiving bore 11 in the spring seat 15 passes through the diametrically smaller portion of the receiving bore 11 and a through bore 21 running coaxially thereto in the mounted receiving sleeve 5, such that the tip of the counter-die 50 juts into the channel bore 24 of the valve part 8 inserted in the receiving sleeve 5. Since the ball pressure screw 19 is height adjustable within a thread 13 configured in the lower opening region of the receiving bore 11, the axial position of the counter-die 50 within the stamping device 1, and thus the height position of the tip 58 of the counter-die 50 in the axial direction, can hence be adjusted.

In the lower outer portion of the connecting branch 4, a knurled nut 25 encloses the connecting branch 4, which is there provided on its outer periphery with a thread turn 20, wherein a cylindrical roller bearing 26 is disposed between the knurled nut 25 and the above-seated receiving sleeve 5.

By unscrewing of the knurled nut 25 from its lower stop position, the receiving sleeve 5 can hence be released from the connecting branch 4.

Figure 2:
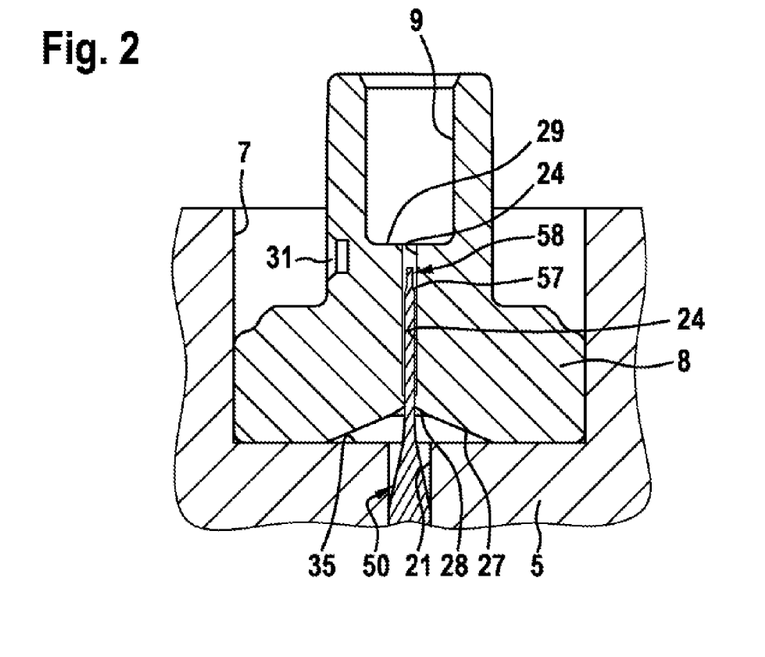
FIG. 2 shows a partial view of the stamping device of FIG. 1 in section.

FIG. 2 shows a detail enlargement of the stamping device 1 in the upper region of the receiving sleeve 5 of H-shaped section. The receiving sleeve 5 has the through bore 21, which runs along the longitudinal center axis 3 coaxially to the two receiving bores 6, 7, yet has an inner diameter that is markedly reduced in relation to the two receiving bores 6, 7, and which corresponds with the receiving bore 11 opening out onto the upper end of the connecting branch 4. The shank 52 of the counter-die 50, which shank is mounted in the lower region of the main body 2, at its head-side end 51, by means of the spring seat 15 in the lower segment of the receiving bore 11, extends along the longitudinal center axis 3 of the stamping device 1, reaches through the through bore 21 and juts with its tip portion 53 into the upper receiving bore 7. As the component, the valve part 8 of a fuel injector is inserted in centered arrangement in the upper receiving bore 7, wherein the valve seat 28 of the valve part 8, said valve seat being formed into a funnel 27, is facing toward the base 35 of the receiving bore 7, and the channel 24 running centrally in the valve part 8 between the valve seat 28 and the guide bore 9 is aligned with the longitudinal center axis or axis of symmetry 3 of the stamping device 1, so that the tip portion 57, 58 of the counter-die 50, jutting out of the through bore 21 into the receiving bore 7 of the receiving sleeve 5, extends axially into this channel 24 and the tip portion 57, 58 is positioned on the projected throttling point in the channel 24 at an axial distance in front of the base 29 of the guide bore 9. That portion 55 of the counter-die 50 which juts into the channel 24 is here configured such that the outer diameter of the portion 55 is tailored to the inner diameter of the channel 24. A countersink 31 provided on the side of the valve part 8 serves in a subsequent method stage to form an inlet throttle into the control chamber.

Figure 3:
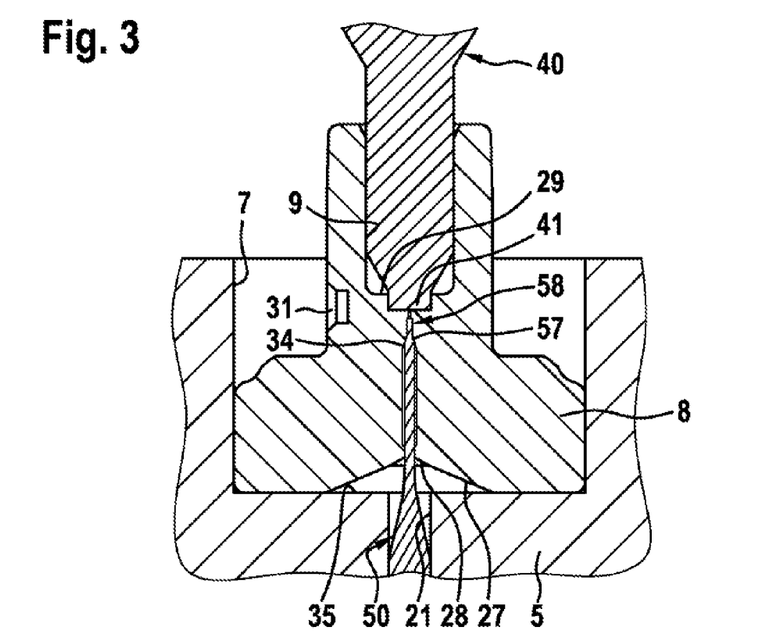
FIG. 3 shows a partial view of the stamping device according to FIG. 1, with a stamping die immersed in a guide bore of the valve part, in section.
Figure 7A:
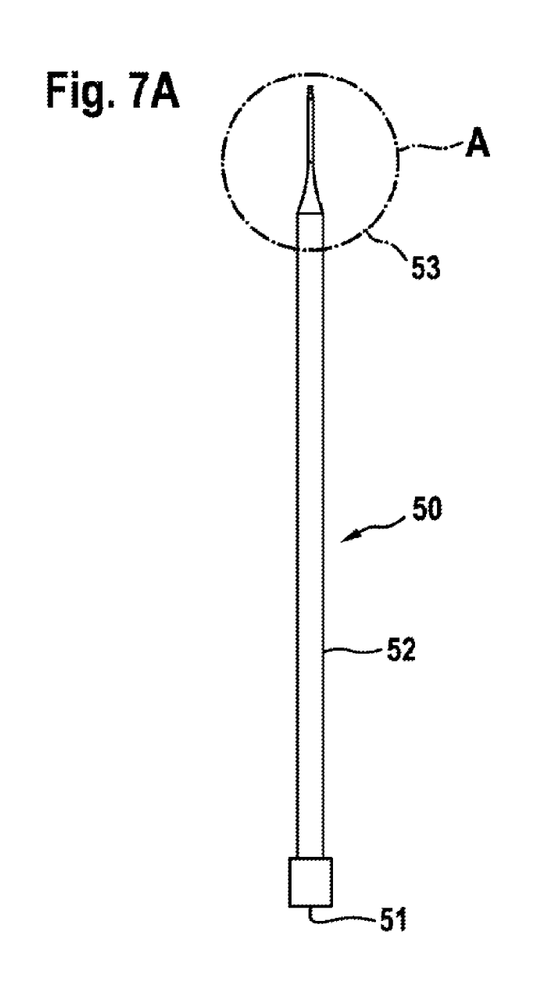
FIG. 7A shows a counter-die, designed for installation in the stamping device, in sectional representation.
Figure 7B:
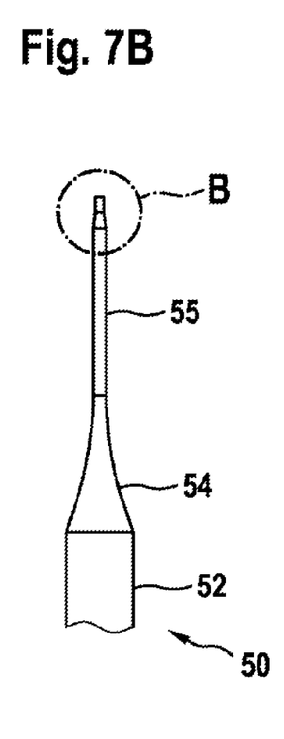
FIG. 7B shows a detail enlargement of the counter-die, according to detail A in FIG. 7A.
Figure 7C:
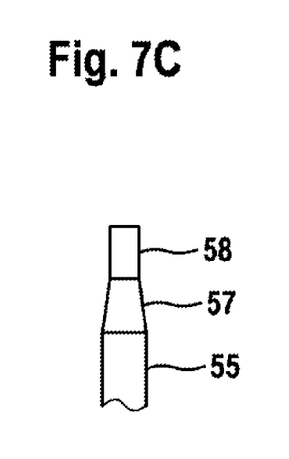
FIG. 7C shows a detail enlargement of the counter-die, according to detail B in FIG. 7B.

FIG. 3 shows a valve part 8 inserted into the receiving sleeve 5 of the stamping device 1. The stamping die 40, which is immersed in the guide bore 9 of the valve part 8 and which is moved longitudinally axially, i.e. along the longitudinal center axis 3, by means of a slide-like force and path control device (not represented), here deforms with its end-face stamping head 41, in dependence on the set force and the set path, the material on the base 29 of the guide bore 9, through which base the channel 24 extends to the valve seat 28, whereby the material, in this case bulk material of the valve part, is swaged in the region of the channel or channel bore 24 and comes to bear there in particular against that tip portion of the 57, 58 of the counter-die 50 which is found in the upper region of the channel bore 24. The topography, i.e. the geometric contour of the tip portion 57, 58 of the counter-die 50, as is illustrated in FIGS. 7A, 7B, 7C, is here mapped onto that region of the channel bore 24 which encloses the tip portion 57, 58, and thus forms a throttle. The throttle contour on which the throttle is founded thus has a counter contour, which during the stamping operation is complementarily assigned to the geometric contour of the tip portion 57, 58 of the counter-die 50.

Figure 4:
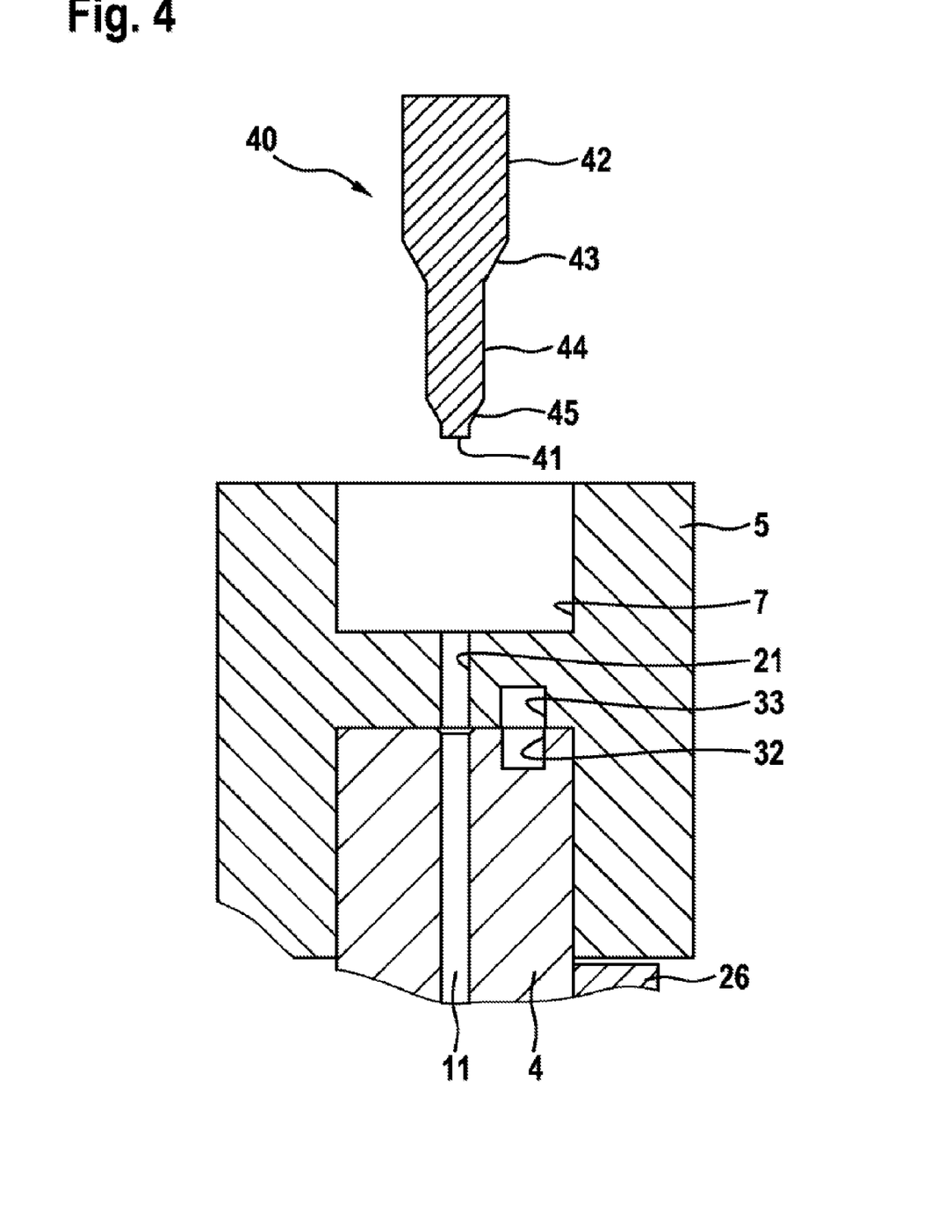
FIG. 4 shows a partial view of a main body of the stamping device in the region of the connecting branch with mounted receiving sleeve and with stamping die oriented coaxially to the longitudinal center axis of the stamping device, in section.

FIG. 4 shows in a detail enlargement the receiving sleeve 5 mounted on the connecting branch 4 in a method stage for setting up the stamping path. To this end, the stamping die 40 is oriented relative to the stamping device 1 such that its longitudinal center axis 46 runs coaxially to the longitudinal center axis 3 of the stamping device 1 and thus to the through bore 21, i.e. the longitudinal centre axis 46 of the stamping die 40 and the longitudinal center axis 3 of the through bore 21 in the stamping device 1 and in the receiving sleeve 5 fastened thereto are oriented in mutual alignment. For this procedure, neither the counter-die nor the valve part is inserted in the stamping device 1. In order to avoid unwanted twisting of the receiving sleeve 5 relative to the connecting branch 4 of the stamping device 1 during removal of the valve part by unscrewing of the knurled nut, on the upper end of the connecting branch 4, eccentrically to the mouth of the through bore 21, is provided a blind hole 32, which, when the receiving sleeve 5 is correctly mounted on the connecting branch 4, corresponds with an associated blind hole 33 disposed in the receiving sleeve 5 eccentrically to the through bore 21 thereof, so that a pin inserted into these opposite blind holes 32, 33 during the assembly of the two components 4, 5 ensures a rotationally secure anchorage of both components 4, 5.

Figure 5:
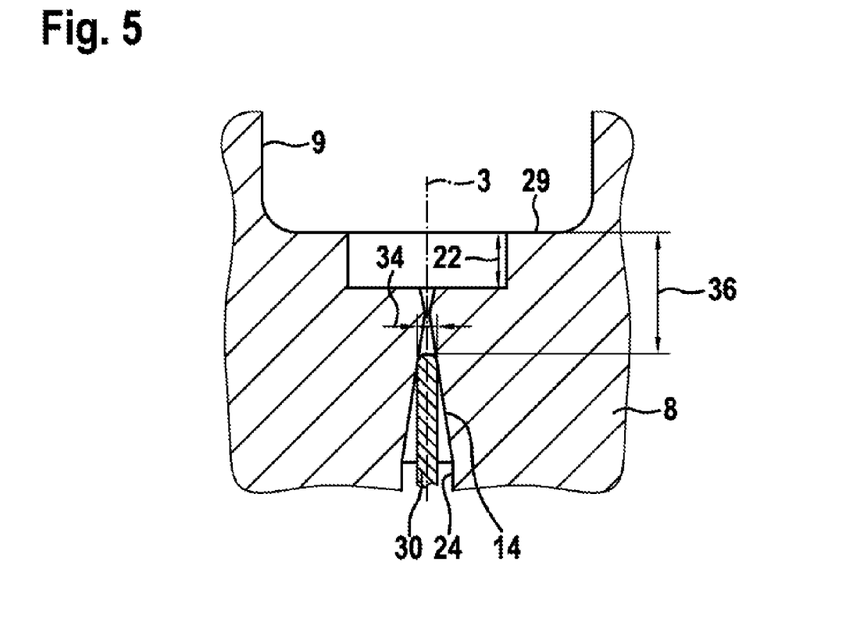
FIG. 5 shows a partial view of a valve part in a method stage for the adjustment of a stamping depth.

FIG. 5 shows a sectional partial view of a valve part 8 inserted in the stamping device 1 in a further method step for the adjustment of a stamping path. In one method step, the stamping die 40 intrudes in the longitudinally axial direction into the guide bore 9 of the valve part 8, to the point where the stamping head 41 abuts with a predetermined contact force, amounting in the preferred illustrative embodiment to around 200 N, against the base 29 of the valve part 8. In this position, the starting or zero position for the stamping path is defined. Starting from this starting position, the stamping head 41 is moved in accordance with a preset stamping force into the base 29 of the guide bore 9, wherein the stamping head 41 plastically deforms or swages the material in the region of the base 29 of the guide bore 9 in such a way that a depression 22 is formed there. This depression 22 in the base 29 of the guide bore 9 constitutes in the axial direction a stamping path which is covered by the stamping head 41 of the stamping die 40 during the plastic material deformation of the valve part 8. The presetting of the stamping path 22 is here effected without a counter-die being inserted into the channel 24 of the valve part 8. Due to the swaging, that portion of the channel bore 24 which borders the depression 22 is constricted in its cross section. With increasing axial distance to the cross sectionally constricted portion 34, the cross-sectional constriction widens into a conical portion 14, so as finally to emerge in that part of the channel bore 24 which is substantially uninfluenced by the swaging. In order to check the cone depth 36, i.e. the axial position and the radial diameter of the cross-sectional constriction 34 within the channel 24, a suitable measuring probe 30 is introduced from the bottom side 10 of the stamping device 1 into the channel 24 and its stop position in the conical portion 14 determined.

Figure 6:
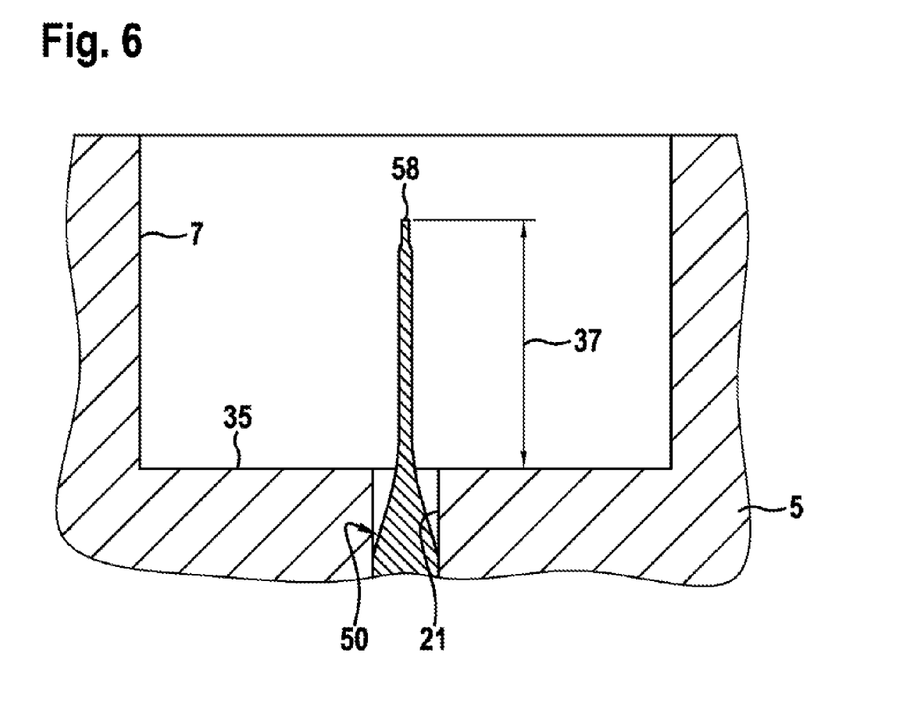
FIG. 6 shows a partial view of the stamping device in the region of the receiving sleeve, with therein inserted counter-die, in sectional representation.

FIG. 6 shows in a following method step the counter-die 50 installed in the receiving sleeve 5 of the stamping device 1 after the setting of the stamping path 22. To this end, the knurled nut 25 is set such that it is in its lower stop position on the connecting branch 4. By means of the ball pressure screw 19, the axial position of the counter-die 50 within the stamping device 1 is set to a predetermined height, i.e. the axial projection 37 of the tip portion 57, 58, jutting into the upper receiving bore of the receiving sleeve 4, in relation to the base 35 of the upper receiving bore 7 is set.

FIGS. 7A, 7B, 7C show the topography of the counter-die 50. As shown by FIG. 7A, extending in the axial direction from the head-side end 51, which, given correct installation in the stamping device 1, is designed to rest on the ball pressure screw 19, is an elongated shank 52, which merges into a tip region 53, wherein the tip region 53 forms the end opposite to the head-side end 51 and has a topographically configured contour. Given correct installation in the stamping device 1, the shank 52 passes through the upper, diametrically smaller portion of the receiving bore 11 of the main body 2 and the adjacent through bore 21 of the receiving sleeve 5 mounted on the connecting branch 4, wherein the tip region 53, tapered in relation to the shank 52, juts out of the upper receiving bore 7 of the receiving sleeve 5 into the channel bore 24 of the valve part 8. In FIG. 7B is illustrated how the shank 52 merges via a conically tapered portion 54 into an intermediate portion 55 of markedly reduced diameter, which intermediate portion is adjoined by the tip portion 57, 58. As is illustrated by FIG. 7C, the elongated intermediate portion 55 merges into a conically tapered portion 57, which is adjoined by a cylindrically configured tip 58 of reduced diameter in relation to the intermediate portion 55. In the inventive stamping method, the reduced diameter of the tip 58 is assigned to the due to be produced throttle cross section in the channel bore 24 of the valve part 8, while the axial length of the cylindrically configured tip 58 substantially defines the throttling length in the channel 24 of the valve part 8. The portion 57, which is conically tapered to the cylindrical tip 58, serves to radially somewhat widen in the flow-off direction the inner cross section of the throttle or throttling point to be produced in the valve part 8, in order, at this point, to re-expand the flow of a medium which, in normal operation of the valve part 8, flows through the throttle.

Figure 8:
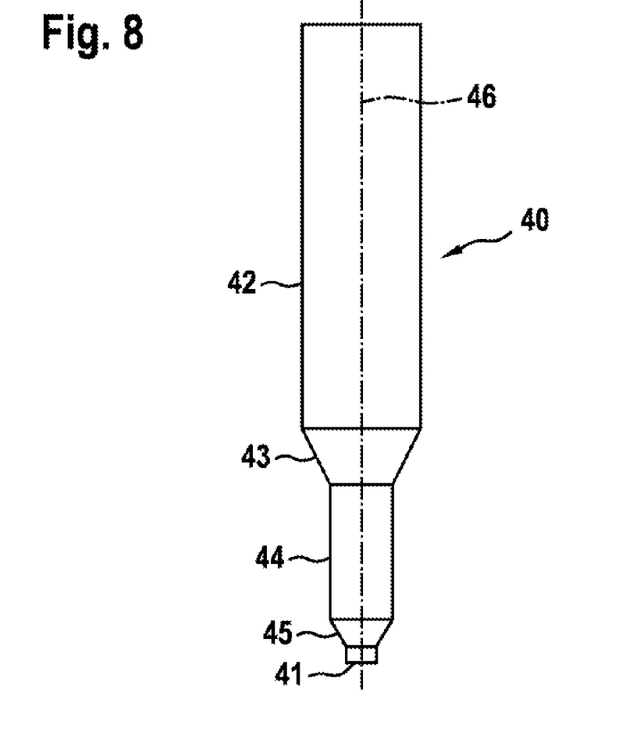
FIG. 8 shows the stamping die for use in the stamping device of FIG. 1, in sectional representation.

FIG. 8 shows the topography of the stamping die 40. An elongated shank 42, which is designed to be clamped into the force and path control device (not represented), merges via a conically tapered region 43 into a diametrically smaller portion 44, wherein the portion 44 is designed for immersion into the guide bore 9 of the valve part 8. The elongated portion 44 is followed by a further conically tapered region 45, which merges into a short cylindrically configured stamping head 41 of reduced diameter. The stamping head 41 here serves in the stamping operation to deform the material on the base 29 of the guide bore 9, such that a depression 22, defining the stamping path, is formed. This depression is reworked in a following machining step. Via this metal-cutting process, a definitive throttling length is set.

Figure 9:
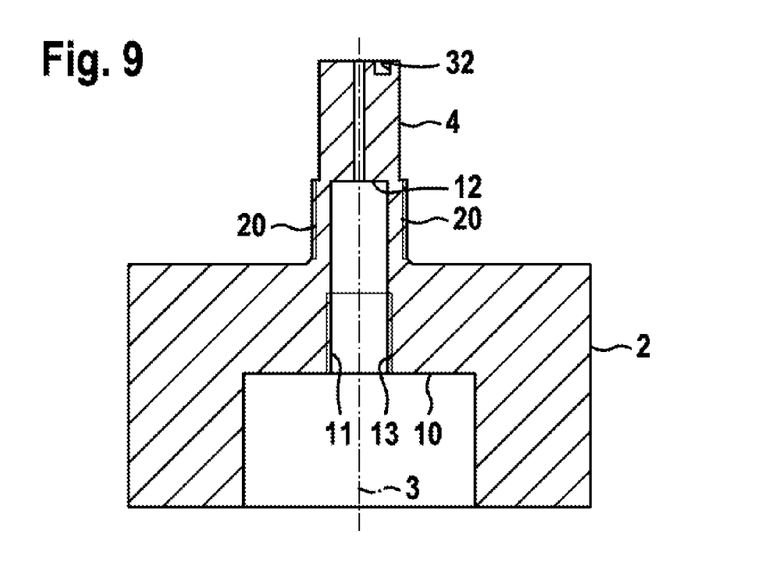
FIG. 9 shows the main body of the stamping device in section.

FIG. 9 shows the main body 2 of the stamping device 1, on which the connecting branch 4 is integrally configured. On the base of the neck of the connection branch 4 is configured, on its outer periphery, a thread turn 20, which is intended to receive the knurled nut 25.

Figure 10:
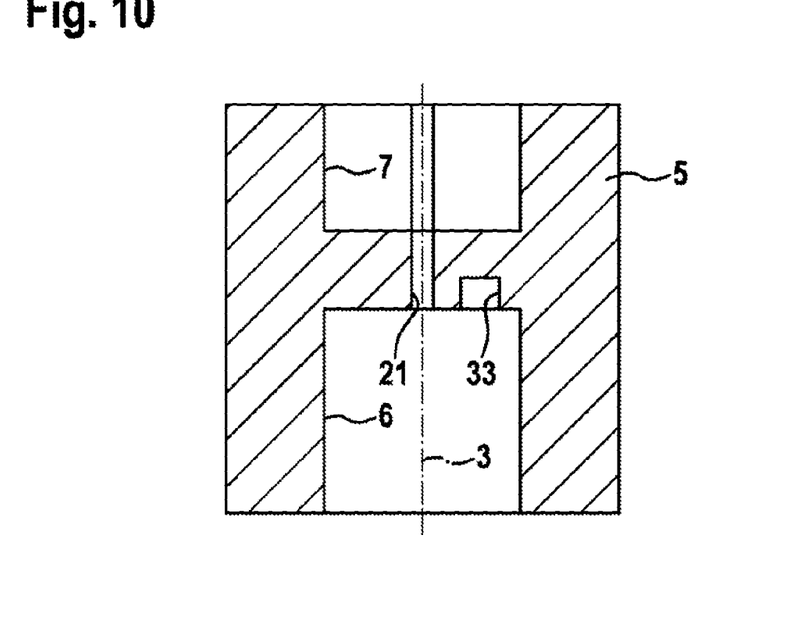
FIG. 10 shows the receiving sleeve of the stamping device in section.

FIG. 10 shows the receiving sleeve 5 comprising the lower receiving bore 6 for coupling to the neck-shaped connecting branch 4 and comprising the upper receiving bore 7 for the reception of a valve part 8 to be stamped.

Figure 11:
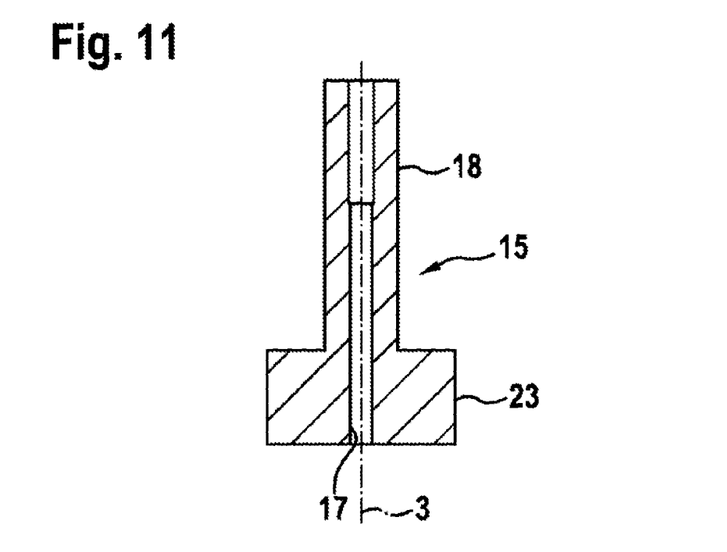
FIG. 11 shows a spring seat designed for the mounting of the counter-die in the stamping device, in section.

FIG. 11 shows the spring seat 15, the longitudinally axially running through bore 17 of which, given correct installation in the stamping device 1, is designed for mounting of the counter-die 50. A compression spring 16 acting between the collar 23 of the spring seat 15 and the step 12 of the stepped bore 11 serves to press the head 51 of the counter-die against the ball pressure screw 19.

Figure 12:
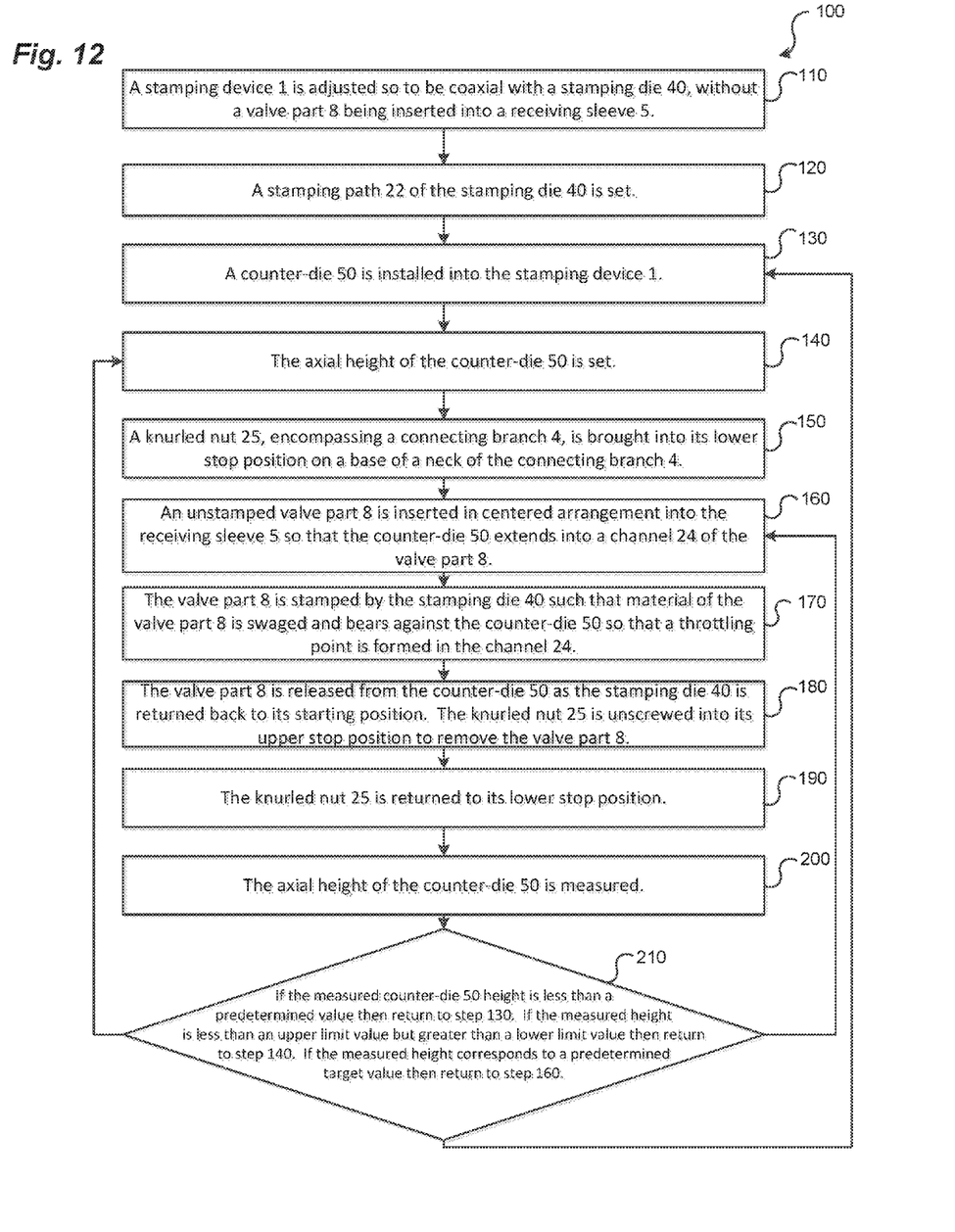
FIG. 12 shows a flow chart comprising the basic method steps of the inventive stamping method.

FIG. 12 shows a flow chart 100 comprising the basic method steps of the inventive stamping method. In a first step 110, the stamping device 1 is here oriented initially in an adjustment procedure concentrically or coaxially to the stamping die 40 clamped in the force and path control device (not represented), without a valve part being inserted into the receiving sleeve 4. The adjustment is here made such that the longitudinal center axis 3 of the stamping device 1 and the longitudinal center axis 46 of the stamping die 40 are arranged coaxially to each other and the stamping head 41 of the stamping die 40 is facing toward the upper receiving bore 7 of the receiving sleeve 5 seated on the connecting branch 4 of the stamping device 1. After this, in a further adjustment step 120, the stamping path 22 is set, in that, after centered insertion of a valve part 8 into the upper receiving bore 7 of the receiving sleeve 4, the stamping die 40, along the longitudinal center axis 3 of the stamping device 1, is immersed or introduced into the guide bore 9 of the valve part 8 to the point where the stamping head 41 comes into contact with the base 29 of the guide bore 9 with a predetermined contact force. In the illustrative embodiment, the contact force amounts to 200 N. This position serves to define a starting or zero position for setting of the stamping path. From this starting position, the stamping head 41 is moved in accordance with a preset stamping force into the base 29 of the guide bore 9, whereupon the stamping head 41 plastically deforms or swages the material in the base 29, to be precise in the region of the channel 24. As a result of this plastic deformation, as is illustrated, in particular, by FIG. 5, a depression 22 is formed in the base 29, which depression, as the stamping depth, defines the stamping path, i.e. the path covered by the stamping die 40 during the plastic deformation. The plastic deformation gives rise not only to the shaping of the depression 22, wherein the length of the channel 24 running through the base 29 is correspondingly shortened, but also to a cross-sectional constriction 34 of the channel 24 in that region of the channel 24 which borders the depression 22; the cross-sectionally constricted portion 34 of the channel 24 is adjoined in the axial direction by a conically widening channel portion 14, which with increasing axial distance from the depression 22 shaped by swaging merges into the original channel bore course of constant and comparatively larger diameter. The axial distance of the conical channel portion 14 from the base 29 of the guide bore 9 of the valve part 8 is referred to as the cone depth 36 and is a process parameter for the setting of the stamping path 22. The necessary stamping path for achieving a specific cone depth 36 is dependent on several factors, including the applied stamping force, the hardness of the valve part and the diameter of the channel bore 24. For this adjustment step, several attempts may be necessary to determine the optimal stamping path, wherein, for each stamping operation according to step 120, a new, unstamped valve part is to be inserted into the stamping device 1.

In the following step 130, the counter-die 50 is installed into the stamping device 1 and the channel bore 24. In the following adjustment step 140, as is illustrated, in particular, by FIG. 6, the axial height of the counter-die 50, i.e. the measure with which the tip portion 57, 58 of the counter-die 50 juts out of the through bore 21 into the upper receiving bore 7 of the receiving sleeve 5, is set. To this end, by turning of the ball screw 19 on which the head 51 of the counter-die 50 is seated, the axial position thereof in the stepped bore 11 is changed, so that the relative axial position of the counter-die 50 within the stamping device 1, and thus the necessary measure for the axial height or the axial projection of the counter-die tip 57, 58 in the upper receiving bore 7 of the receiving sleeve 5 in relation to the base 35, is adjustable. In a further method step 150, the knurled nut 25 encompassing the connecting branch 4 is brought into its lower stop position on the base of the neck of the connecting branch 4. After this, in step 160, an unstamped valve part 8 is inserted in centered arrangement into the receiving sleeve 5 of the stamping device 1. In the installed state, the tip 57, 58 of the counter-die 50 juts into the channel 24 of the valve part 8 such that the contoured tip lies on the projected throttling point within the channel 24. In the following method step 170, the actual stamping operation of the valve part 8 takes place. Firstly, the axial immersion of the stamping die 40 into the guide bore of the valve part 8 is effected by means of the force and path control device to the point where the valve part 8 is detected with the preset contact force through contact between the stamping head 41 and the base 29 of the guide bore 9; for this purpose, the force and path control device has, in the illustrative embodiment, a force transducer in the force range from 0-20 kN at a measurement value registration rate of min. 500 Hz, wherein the contact force is set at 200 N. The position in which the contact is made is defined as the starting or zero position. Starting from this starting position, in the actual stamping operation with a stamping force which is preset higher than the contact force, the stamping path set in method step 120 is then traveled at a predetermined speed, amounting in the illustrative embodiment to 50 mm/min. Through plastic deformation, as is illustrated, in particular, by FIG. 3, the depression 22 is formed in the base 29, whereupon the length of the channel 24 in the region of the base 29 shrinks correspondingly; at the same time, the throttling point is formed in that region of the channel 24 which borders the depression 22, in that the material swaged by the plastic deformation bears against the contoured tip 57, 58 of the counter-die 50 which juts into the channel 24 in the region of the projected throttle or throttling point, i.e. in the region of the cross-sectional constriction 34 of the channel 24. In the illustrative embodiment, the tip portion 57, 58 of the counter-die 50 is here molded or mapped with its cylindrical tip region 58 and the underlying frustoconical tip region 57 in the cross-sectionally constricted region 34 of the channel 24. The throttle which is thereby produced in the cross-sectionally constricted region 34 of the channel 24 has as a stamping impression the contour geometry of the tip portion 57, 58 of the counter-die. The stamping depth is dimensioned such that the tip 58 of the counter-die and the stamping head 41 of the stamping die remain axially spaced.

Following the stamping operation in step 170, in step 180 the valve part 8 is next released from the counter-die 50, in that the stamping die 40 is returned by means of the force and path control device back into its starting position and the knurled nut 25 is unscrewed from its lower stop position into its upper stop position in order to remove the valve part 8 and subject it to reworking such as a nitriding-based hardening procedure and a following hydroerosive rounding. In two further method steps, in step 190 the knurled nut 25 is turned back into its lower stop position, so as afterward, in step 200, to measure the axial height of the counter-die 50, i.e. the axial projection 37 in the upper receiving bore 7 of the receiving sleeve 5. If, in a following comparison step 210, the measurement reveals that the measured height of the counter-die 50 is less than a predetermined limit value, then the counter-die 50 is exchanged and the method begins anew with step 130, since in this case the significant deviation of the measurement value from the predetermined value suggests damaging or breakage of the counter-die 50. If the measurement reveals that the measured height is less than an upper limit value but is greater than a lower limit value, then the method begins anew with step 140, i.e. with setting of the axial height of the counter-die; if the measurement reveals that the measured height corresponds to a predetermined target value, then the method can be continued with stamping of a new valve part, in that the procedure is resumed from step 160 with the insertion of a new unstamped valve part.

In summary, the inventive method provides that, following formation of the flow channel 24 in the valve part 8, the stamping of the throttle or throttle part 34 is performed, in that material in the vicinity of the flow channel 24 is plastically deformed in the direction of the projected throttling point 34 and the plastically deformed material acts in such a way on a forming tool 50, 57, 58 introduced into the flow channel 24 at the position of the projected throttling point 34 that a contour 57, 58 of the forming tool 50, which contour defines the throttling point 34, is formed in the flow channel 24. The plastic deformation is here effected by a stamping die 40 moved with defined force, while the contour of the throttling point 34 is shaped by a tip portion 57, 58 of a counter-die 50 used as a forming tool.

The invention claimed is:

1. A method for producing a throttle (34) in a flow channel (24) of a component, the throttle (34) configured to control a flow rate of a medium through the flow channel (24) from a control chamber, the method comprising:
   forming the flow channel (24) in the component (8);
   inserting a forming tool (50, 57, 58) in the flow channel (24); and
   stamping the component (8) in the vicinity the flow channel (24), while the forming tool (50, 57, 58) is in the flow channel (24), thereby deforming a portion of the flow channel (24) by plastically deforming material of the component (8) in the vicinity of the flow channel (24),
   wherein, as a result of the stamping, the deformed portion of the flow channel (24) forms a contour which defines the throttle (34), the contour narrowing toward a throttle point and widening downstream of the throttle point.

2. The method as claimed in claim 1, in which the stamping is performed by a stamping die (40) guided in a guide bore (9) of the component (8), wherein the stamping die (40) is moved with defined force against a base (29) of the guide bore (9), through which base the flow channel (24) extends, and the material which is deformed at a bottom by the stamping die (40) comes to bear against the forming tool (57, 58) positioned in the flow channel (24).

3. The method as claimed in claim 2, in which a counter-die (50), a tip portion (57, 58) of which is positioned in such a way in the flow channel (24) that the material deformed at the bottom by the stamping die (40) is shaped by the tip portion (57, 58) to form the contour in the flow channel (24), is the forming tool.

4. The method as claimed in claim 3, in which, for molding of the contour, the tip portion (57, 58) of the counter-die (50) has on an end side a cylindrical tip (58) and an upstream transition portion (57) tapered frustoconically in a direction of the tip (58).

5. The method as claimed in claim 2, in which, for the plastic deformation of the material, the stamping die (40) is controlled such that a motional axis of the stamping die (40), which determines the deformation, runs roughly coaxially to a direction of longitudinal extent of the flow channel (24) and the deformation of the material of the component (8) is effected by a stamping head (41) of the stamping die (40) up to a predetermined stamping depth (22), wherein, as a result of the stamping, the stamping head (41) produces a depression, forming the control chamber, in accordance with the stamping depth.

6. The method as claimed in claim 1, in which the plastic deformation of the material is performed symmetrically to an axis of symmetry of the component (8) and of the flow channel (24) running in the component (8).

7. The method as claimed in claim 1, in which the material of the component (8) is plastically deformed by swaging.

8. The method as claimed in claim 1, in which, after the stamping operation, a hardening of the component (8) is performed.

9. The method as claimed in claim 1, in which, after the stamping operation, reworking of the throttle (34) by hydro-erosive rounding is performed.

* * * * *